Figure 1:
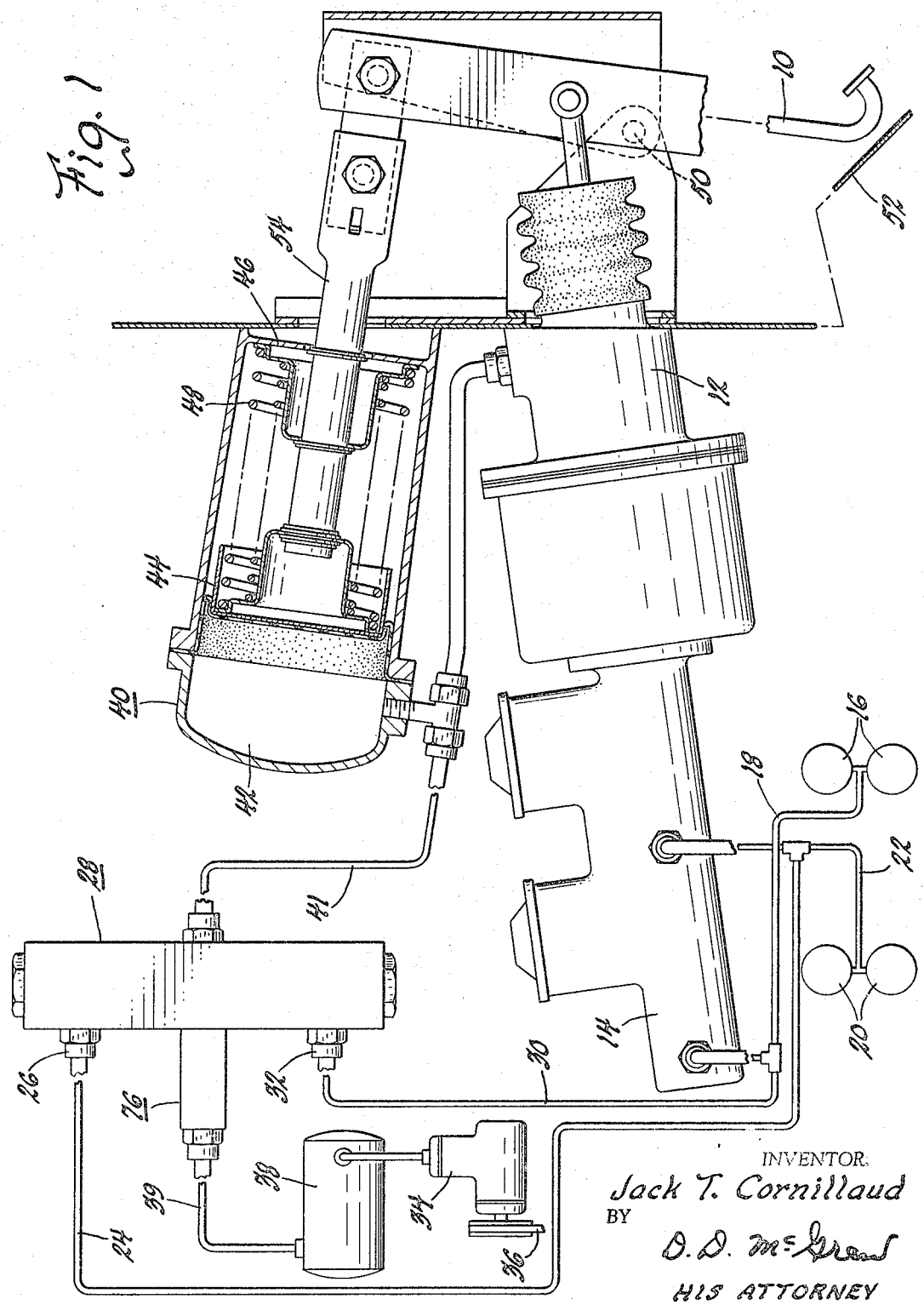

March 21, 1967  J. T. CORNILLAUD  3,309,966
DIFFERENTIAL PRESSURE HYDRAULIC VALVE AND FLUID MOTOR
Filed June 11, 1964  2 Sheets-Sheet 1

INVENTOR.
Jack T. Cornillaud
BY
O. D. McGrew
HIS ATTORNEY

United States Patent Office
3,309,966
Patented Mar. 21, 1967

3,309,966
DIFFERENTIAL PRESSURE HYDRAULIC VALVE AND FLUID MOTOR
Jack T. Cornillaud, Dearborn, Mich., assignor to General Motors Corporation, Detroit, Mich., a corporation of Delaware
Filed June 11, 1964, Ser. No. 374,362
8 Claims. (Cl. 91—391)

This invention relates to hydraulic-air valves and more particularly to an hydraulically balanced valve which controls an air supply as the valve becomes unbalanced.

In vehicle braking systems utilizing a pedal level control mechanism that is responsive to air pressure, a control valve is desired to cut off air pressure when there is a failure in an hydraulic system. This type of pedal control mechanism is normally desired when an hydraulic system fails in order to gain a greater mechanical advantage for unpowered brake operation. In a braking system utilizing a dual master cylinder for a vehicle braking system having independent front and rear wheel hydraulic systems, a different problem arises. If one of the hydraulic systems fail in a vehicle equipped with separate systems, it is not always immediately apparent to the vehicle operator that one of the systems has failed. At lower speeds and under low load conditions, one of the braking systems may be sufficient to stop the vehicle. However, under different operating conditions, a vehicle operator may anticipate having greater braking capability than he actually has and may become involved in a situation where he has insufficient braking to stop the vehicle in the required distance. The subject invention will provide a warning to a vehicle operator on a vehicle having two separate hydraulic systems for braking when one of the braking systems fails.

It is also possible that operating conditions could be had wherein the failure of one hydraulic system in a vehicle braking system having independent hydraulic systems where greater pressure than normally available with a single system would be required to stop a vehicle. In this circumstance, the brake pedal would be automatically raised to a greater distance above the floor board of a vehicle in order to provide a greater mechanical advantage for operation of a single remaining hydraulic system for braking.

It is an object of the present invention to provide a control valve that is hydraulically balanced by two hydraulic systems that will control the air supply to a device raising the brake pedal level when one hydraulic system fails.

It is another object of the present invention to provide an improved hydraulically controlled air valve that will give a warning to an operator of a vehicle having two independent braking systems when one of the systems fails.

It is still another object of the present invention to provide a control device which will shut off the supply of air to a device which pneumatically maintains a brake pedal in a low disposition relative to the floor of a vehicle when one or two hydraulic systems normally available to stop a vehicle fails.

It is a further object of the present invention to provide a control device that will regulate fluid pressure in response to a differential hydraulic pressure acting on either end of the control device.

It is still a further object of the present invention to provide a valve that is hydraulically balanced by two independent hydraulic systems and is utilized to control pneumatic equipment when the valve becomes hydraulically unbalanced.

Further objects and advantages of the present invention will be apparent from the following description, reference being had to the accompanying drawings wherein a preferred embodiment of the present invention is clearly shown.

Figure 2:
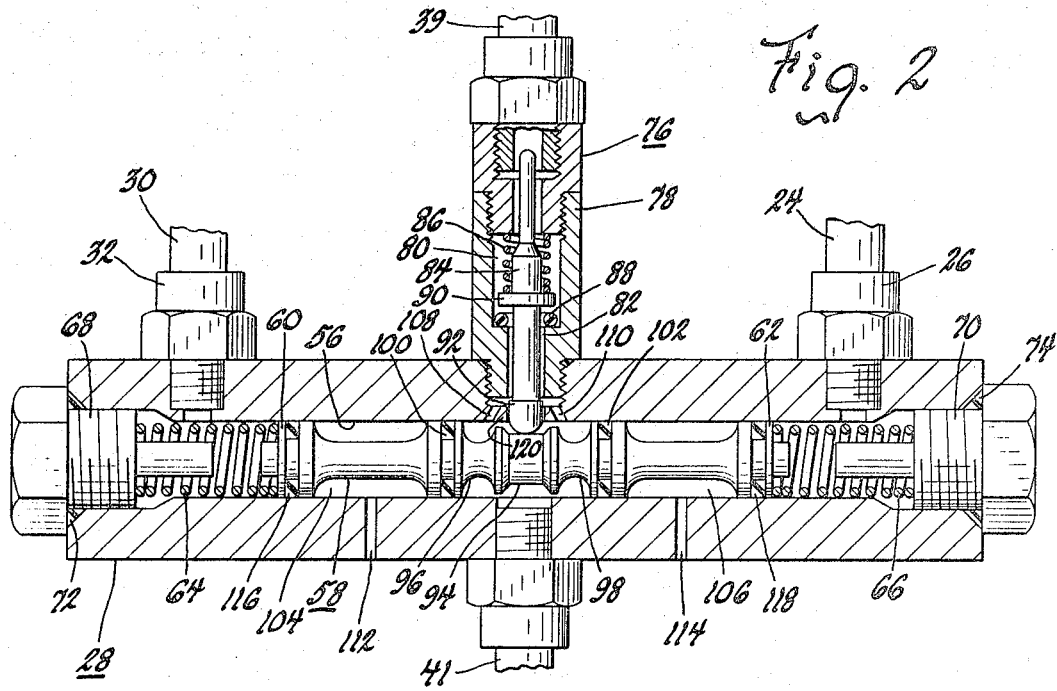
Figure 3:
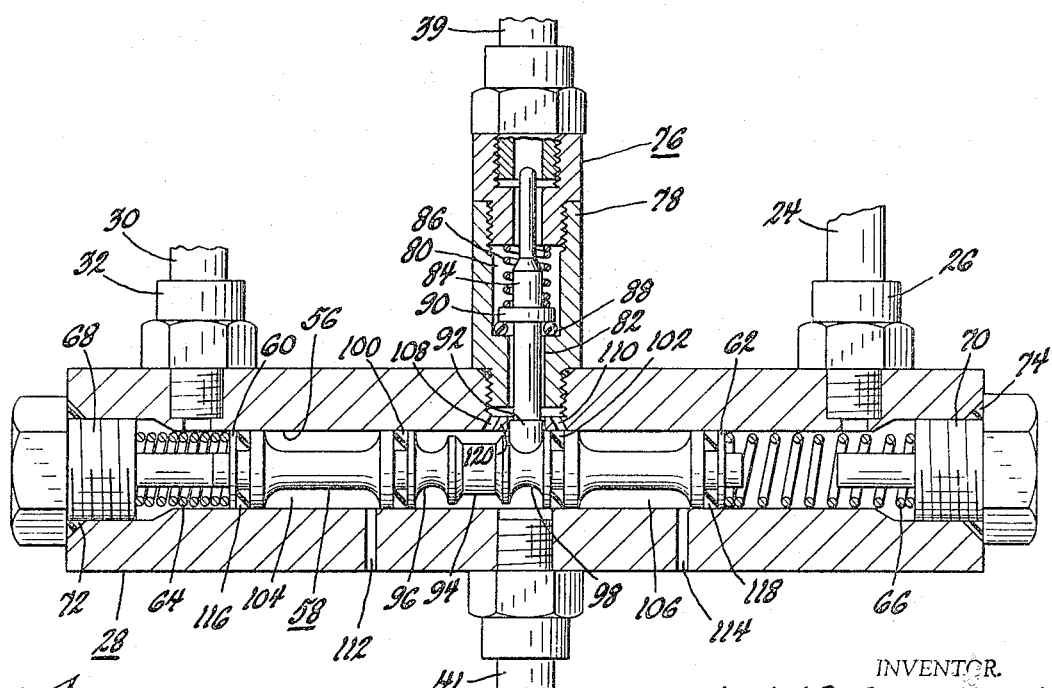

In the drawings:
FIGURE 1 is a diagrammatic illustration of a vehicle braking system in which the subject invention is operatively disposed;
FIGURE 2 is a sectional view of the subject invention, the valve shown in a balanced condition;
FIGURE 3 is a sectional view of the subject invention, the valve being shown in an unbalanced condition.

Referring now to FIGURE 1, a brake pedal 10 is operatively associated with a pneumatic power booster 12 which is used to control a force intensifier for operation of a master cylinder 14 for powered hydraulic brake operation. The master cylinder 14 is a dual master cylinder, that is, two hydraulic master cylinders mounted in tandem that are simultaneously actuated to provide a pressure build-up to the front and rear wheel brakes of a vehicle. A series of brakes 16 would be energized through a line 18 from a portion of the master cylinder and a series of brakes 20 would be energized through a line 22 from another portion of the master cylinder. The power booster 12 can be any one of a general type having a suspended diaphragm therein which is operated by air under pressure being fed to one side of the diaphragm. A line 24 communicates hydraulic pressure from the line 22 to an inlet 26 into the control device, generally designated by the numeral 28. A line 30 to an inlet 32 of the control device 28 maintains another portion of the device 28 in pressure communication with the hydraulic line 18 to the brakes 16. It therefore becomes apparent that the inlet 26 is pressurized to the same extent that the lines 22 are pressurized and the inlet 32 is pressurized to the same degree that the line 18 is. Under normal operating conditions, the pressure output from the dual master cylinder 14 will be equal and, therefore, equal pressures will be felt in the inlets 26 and 32.

An air compressor 34, driven by a fan belt 36 of a vehicle, not shown, pressurizes an accumulator 38 and supplies air pressure through a line 39 to a control device 28, to the power booster 12 and to a pedal level control device, generally designated by the numeral 40, through a line 41. It is understood that the control device could be placed between the compressor 34 and the accumulator 38 or between the accumulator 38 and the power booster 12 and the pedal level control device 40 as herein illustrated.

The pedal level control device 40 is not intended to be a part of this invention in and of itself but only as it combines in operation with the control device 28. Very briefly, an air pressure is supplied to a chamber 42 which drives a piston 44 toward a wall 46 against the pressure of a spring 48 to pivot the brake pedal 10 around a point 50 into a low disposition relative to a floor board 52 of an automobile. It is obvious that, if pressure is lost in the chamber, the spring 48, being under compression, will drive the piston 44 and an arm 54 connected to the brake pedal 10 relative to the wall 46, thereby pivoting the brake pedal 10 on the point 50 to a high disposition relative to the floor board 52. It is a function of the control device 28 to pass or cut off air pressure from the compressor 34 to the chamber 42 in response to hydraulic pressure at the inlets 26 and 32. It is clear that the pedal level control device used with this system could be hydraulically controlled with the subject device controlling the pressure or flow of another type fluid than air.

Referring now to FIGURE 2, the control device 28 has disposed through the center thereof a bore 56 defining the limits of a chamber. A piston 58 is slidably disposed in the bore or chamber 56 between the hydraulic inlets 26 and 32. The piston 58 is maintained in substantially centered disposed in the bore 56 by equal hydraulic pressures from the lines 24 and 30 against ends 60 and 62 of the piston 58. In addition to the equal hydraulic pressures, the piston 58 is also centered by a spring 64 and a spring 66 of equal strength bearing against the ends 60 and 62 respectively. A threaded screw 68 provides a closure means for one end of the bore 56 and a threaded screw 70 provides a similar closure means for an opposite end of the bore 56. The screws 68 and 70 press seals 72 and 74, respectively, against a portion of the bore 56 in order to maintain the bore 56 fluid-tight.

The line 39 from the accumulator 38 engages an inlet means, generally designated by the numeral 76, which involves, basically, an air valve biased toward the closed position. An airtight housing 78 contains a chamber 80 and a chamber 82. A slidable valve 84 is biased by a spring 86 toward a seal 88. A peripheral flange 90 formed as a portion of the valve 84 is adapted to seat against the seal 88 to isolate the chamber 80 from the chamber 82. The projection 92 of the valve 84 extends through the passage 82 and bears against a surface 94 of the piston 58. While the surface 94 of the piston 58 bears against the extension 92 of the valve 84, the flange 90 is held away from the seal 88 against the force of the spring 86 and allows free fluid communication between the chamber 80 and the chamber 82.

The surface 94, as herein described, defines the surface of a first groove formed on the periphery of the piston 58. A surface 96 and a surface 98 define a pair of deeper grooves than the one defined by the surface 94 and are equally spaced on either side of the groove defined by the surface 94. During the operation of the valve to be hereinafter described, the extension 92 is adapted to move onto either of the surfaces 96 or 98 when the piston 58 becomes unbalanced due to a differential pressure existing in the lines 24 or 30. It is to be noted that the surfaces 96 and 98, defining deeper grooves than that defined by the surface 94, will allow the extension 92 of the valve 84 to move further with the assistance of the spring 86 so that the valve carried flange 90 engages the seal 88. As the seal 88 is compressed by the flange 90, the chamber 80 is isolated from the chamber 82.

Peripherally disposed seals 100 and 102 are mounted on the piston 58 and serve to prevent fluid communication between the area between the seals and an area 104 and 106 formed on the outside of the seals 100 and 102 by the depressed portion of the piston 58. A passage 108 and a passage 110 allow fluid communication between the portion of the bore 56 that is disposed between the seals 100 and 102 and the chamber 82. During normal operation, the passages 108 and 110 serve to provide a path for pressure communication between the chamber 82 and the outlet to the line 41 but, when the piston 58 shifts so that the surface 96 or 98 engages extension 92 of the valve 84, a by-pass is provided from the area between the seals 100 and 102 into the areas 104 and 106 around the seals 100 and 102. The purpose of this by-pass will be hereinafter described. Passage 112 and passage 114 provide a communication to the atmosphere for the areas 104 and 106, respectively.

A seal 116 peripherally disposed on the piston 58 serves to prevent the passage of fluid past the end 60 of the piston 58. It is clear that the seal 116 is designed to prevent hydraulic fluid, normally present in the area of the bore 56 in which the spring 64 is disposed, from entering the area 104 of the bore 56 as well as preventing atmosphere, normally present in the area 104, from entering the hydraulic line 30. A seal 118 likewise peripherally disposed on the piston 58 serves exactly the same purpose on the end 62 of the piston 58 that the seal 116 serves on the end 60 of the piston 58.

In operation and referring to FIGURE 1, the compressor 34 is driven by the engine and arranged to maintain a pressure in the accumulator 38. Presuming at this time that the two independent hydraulic systems are functioning normally, air pressure will be communicated to the chamber 42 of the pedal level control device 40. This air pressure in the chamber 42 will be sufficient to hold the piston 44 in its one extreme of movement toward the wall 46, thereby pivoting the brake pedal lever 10 in a clockwise fashion around point 50 by means of the pressure exerted on the arm 54 engaging the brake pedal 10 by the piston 44. While the brake pedal is in this position, the hydraulic braking system has a powered capability in that air under pressure is also supplied to the power booster 12. While the braking system has a powered capability, very little movement of the brake pedal 10 is required for actuation of the braking system and the proximity of the brake pedal 10 to the floor board 52 is desirable.

However, if an hydraulic leak develops in either of the hydraulic systems adapted to pressurize the brakes 16 or the brakes 20, it becomes necessary to communicate this fact to the operator of the vehicle. In addition, it becomes desirable, during the operation of one brake system alone, to initially provide a greater mechanical advantage for the pressurization of that system than is normally available during a period when the system has a powered capability.

Referring now to FIGURE 2, it will be assumed that both hydraulic systems are functioning normally. Under these operating conditions, the hydraulic pressure in the lines 24 and 30 would be equal and, therefore, the pressure on the ends 60 and 62 of the piston 58 would likewise be equal. Therefore, the piston 58 would be in the balanced condition and disposed in the bore 56 substantially as illustrated in FIGURE 2. It is seen that, when the piston 58 is so positioned, the extension 92 of the air valve 84 is riding on the surface 94 of the piston 58. The valve 84 is therefore open and free communication of air is had between the lines 39 and 41. It is also seen, when viewing FIGURE 1, that the chamber 42 is pressurized as is the power booster 12.

It will now be assumed that an hydraulic leak develops in the front wheel brakes 16. A loss of hydraulic pressure will be immediately felt at the inlet 32 because of a decrease of pressure in the lines 18 and 30. The piston 58 immediately becomes unbalanced in the direction of the inlet 32.

Referring now to FIGURE 3, a differential pressure will exist between the end 62 and the end 60 of the piston 58. The piston 58 is driven leftwardly, as viewed in FIGURE 3, until the spring 64 is completely depressed. This is designed to occur at the same time that the extension 92 of the air valve 84 comes into engagement with the surface 98 of the piston 58. As previously described, the groove defined by the surface 98 is deeper than the groove defined by the surface 94 and, therefore, the force of the spring 86 drives the extension 92 into the groove defined by the surface 98 and causes a seal to be made between the flange 90 of the valve 84 and the seal 88. In this condition of operation, there is an interruption in the air communication between the chamber 80 and the chamber 82. At this point in operation, there is still air pressure trapped in the chamber 82, in the line 41, in the chamber 42 of the pedal level control 40, and the power booster 12. It is then obvious that, at this instant, the brake pedal 10 is still at a low level with respect to the floor board 52.

However, the passage 110 is provided to allow the trapped pressure existing between the seals 100 and 102 to communicate pressure around the seal 102 into the area 106 through the passage 114 to the atmosphere. Therefore, the trapped pressure is immediately bled to the atmosphere in the preferred embodiment. It is understood that the extension 92 of the air valve 84 is generally of a configuration matching the surface 98. The metal-to-metal contact between the extension 92 and a guide 120 through a wall of the control device 28 is not airtight and the bleeding, previously described, takes place. Another embodiment of this invention would not require the bleed passages 108 and 110 for proper operation thereof. During normal operation of an air powered booster, a certain amount of air pressure is bled off at each actuation. Therefore, air trapped on the outlet side of the device 28 would bleed to the atmosphere through the power booster in a slower fashion than herein described and the pedal 10 would be gradually raised as air pressure in the chamber 42 is depleted. In a given installation this might be more desirable than the more rapid raising of the pedal allowed by the incorporation of the bleed passages 108 and 110.

Referring now to FIGURE 1, as the pressure is lost in the chamber 42, the spring 48, having been compressed, drives the piston 44 away from the wall 46. As the piston 44 moves, it carries the arm 54 in the same direction and, due to the engagement of the arm 54 with the brake pedal 10, one end of the pedal 10 is pivoted around the point 50 into a high disposition with respect to the floor board 52. As this occurs, the vehicle operator is immediately informed of a failure in one of the hydraulic systems and a high brake pedal is provided which initially allows a greater mechanical advantage for the pressurization of the operative hydraulic system. The objects previously recited are therefore carried out when the subject invention is used in combination with a braking system of the type herein described.

The utility of the present invention is extended into any application where a balanced pressure is used to control a fluid flow. It is understood that the balanced pressure could be provided by the same type media that the valve 84, recited herein as an air valve, controls. It is equally obvious that any type fluid could be used to provide the balanced pressure and any type fluid could be controlled while still keeping within the inventive concept set forth herein.

While the embodiment of the present invention, as herein disclosed, constitutes a preferred form, it is to be understood that other forms might be adopted.

What is claimed is as follows:

1. In a vehicle braking system having a single actuator pedal and two independent hydraulic systems, a control device comprising: a control body; a chamber extending through said control body; inlet means for a fluid medium into said chamber; outlet means for a fluid medium from said chamber disposed in fluid communication with said inlet means; piston means slidably disposed in said chamber and biased into centered disposition relative to the inlet means; fluid entry means into said chamber providing an equal hydraulic pressure on opposite ends of said piston means to maintain said piston means in centered disposition in said chamber, said piston means being responsive to a pressure differential between its opposite ends to move said inlet means out of fluid communication with said outlet means and latches at an extreme of movement to maintain fluid communication shut-off until the pressure imbalance disappears.

2. In a vehicle braking system having two independent hydraulic systems and a single actuator adapted to be raised into a position having a greater mechanical advantage by fluid means, a control valve comprising: a control body having a chamber disposed therein; piston means slidably disposed for translational movement in said chamber, said piston means being biased into centered disposition with respect to the chamber; hydraulic inlet means from each of the independent hydraulic systems into said chamber arranged to place equal pressures on opposite ends of the piston means to maintain a balancing thereof; fluid pressure inlet means including a reciprocable valve disposed in centered juxtaposition relative to the piston means; and outlet means from said chamber to the fluid means adapted to raise the actuator means when fluid pressure thereto is cut off, said piston means being an hydraulically balanced valve responsive to a loss of hydraulic pressure at either end to slide translationally in said chamber thereby uncentering said reciprocable valve allowing it to close and isolate the outlet means from the inlet of fluid pressure, said isolation of fluid pressure at said outlet means allowing the actuator of the braking system to be raised thereby providing an increased mechanical advantage for operation of the remaining pressurizable hydraulic system and warning a vehicle operator of a system failure, said piston means including means cooperating with said reciprocable valve for positively locating said piston means in any selected condition during operation.

3. The combination of a fluid operable device including a piston means biased against a spring force by pneumatic pressure whereby a brake pedal is maintained at a low point relative to the floor of a vehicle, said brake pedal being adapted for pivotal movement around a variably positioned pivot point, and a control valve of the type described in claim 2 whereby the brake pedal is pivotally moved to a high position relative to a floor of a vehicle when hydraulic pressure is lost in either of the independent hydraulic systems.

4. In a vehicle braking system having two independent hydraulic systems and a single actuator pedal therefor, said pedal being adapted to be raised into a higher poised position in response to a loss of pneumatic pressure, a control valve comprising: a control body having a chamber disposed therein; piston means biased from the ends of the chamber into a centered disposition therein and being arranged for sliding translational movement in said chamber, said piston means having a peripherally disposed first groove and a plurality of second grooves of greater depth than the first groove and disposed an equal distance on either side of said first groove; hydraulic inlet means from the two independent hydraulic systems into said chamber and each communicating an equal pressure to opposite ends of said piston means; an inlet into said chamber from a pneumatic pressure source, said inlet including a reciprocable valve biased toward the closed position but normally maintained in the open position by a portion cooperating with the peripherally disposed first groove; said portion dropping into said second grooves to assume a sealed disposition while holding said piston means in a selected position, and outlet means for pneumatic pressure from said chamber into pneumatic operable means arranged to keep the actuator pedal in the lower poised position, said piston means being responsive to a loss in hydraulic pressure from one of the two independent hydraulic systems to upset the normal balanced condition of the piston means to move said piston means translationally in said chamber so that the portion of the reciprocable valve normally disposed in said first groove is caused to engage either of the second deeper grooves whereby the reciprocable valve is biased to the closed position wherein the pneumatic pressure is prevented from going to the outlet means and this loss of pneumatic pressure raises the actuator pedal into the higher poised position, the raised actuator pedal providing a greater mechanical advantage for brake actuation and giving a warning to a driver of a failure of pressure in one of the two independent hydraulic systems.

5. A control valve according to claim 4 wherein the piston means has a plurality of circumferentially disposed seals to maintain different operative areas of said chamber having hydraulic and pneumatic pressures acting therein isolated from one another.

6. A control valve according to claim 5 wherein the control body has a series of passages affording a fluid communication of the pneumatic operable means with the atmosphere circumventing one of the plurality of seals when the piston means is moved to either extreme of translational movement.

7. The combination of a vehicle braking system having two independent hydraulic systems operated by a single actuator pedal and pneumatic operable means for varying the proximity of the actuator pedal to a vehicle floor, and a control valve of the type described in claim 4.

8. A control device comprising: a housing; first means slidably disposed in said housing and having opposite ends under equal pressures; second means disposed for reciprocating movement in said housing perpendicular to said first means and having a portion centered with respect to said first means engaging peripheral portions thereof, said second means adapted to control a fluid flow; and outlet means in fluid communication with said second means, said second means being responsive to a sliding movement of said first means, engendered by the pressures acting thereon becoming unequal, to isolate the fluid flow in said second means with respect to the outlet means by engaging selected peripheral portions of said first means wherein fluid communication is cut off between said second means and said outlet means.

References Cited by the Examiner

UNITED STATES PATENTS

| | | | |
|---|---|---|---|
| 404,472 | 6/1889 | Dunn | 91—460 |
| 817,277 | 4/1906 | Saugstad | 137—596.18 |
| 2,327,055 | 8/1943 | McMahan | 137—458 |
| 2,400,126 | 5/1946 | Matthews | 91—453 |
| 3,143,930 | 8/1964 | Ayers | 91—391 |
| 3,165,121 | 1/1965 | Strauss et al. | 251—58 |
| 3,208,223 | 9/1965 | Watanabe | 60—54.5 |

MARTIN P. SCHWADRON, *Primary Examiner.*

PAUL E. MASLOUSKY, *Examiner.*